(12) United States Patent
Cronin et al.

(10) Patent No.: US 11,081,113 B2
(45) Date of Patent: Aug. 3, 2021

(54) IDEA SCORING FOR CREATIVITY TOOL SELECTION

(71) Applicant: Bright Marbles, Inc., Menlo Park, CA (US)

(72) Inventors: John Cronin, Jericho, VT (US); Burt Cummings, Menlo Park, CA (US); Charles Root, Underhill, VT (US); Michael D'Andrea, Burlington, VT (US); Jeffrey Goodwin, Montpelier, VT (US)

(73) Assignee: BRIGHT MARBLES, INC., Menlo Park, CA (US)

( * ) Notice: Subject to any disclaimer, the term of this patent is extended or adjusted under 35 U.S.C. 154(b) by 118 days.

(21) Appl. No.: 16/551,055

(22) Filed: Aug. 26, 2019

(65) Prior Publication Data
US 2020/0066277 A1    Feb. 27, 2020

Related U.S. Application Data

(60) Provisional application No. 62/722,421, filed on Aug. 24, 2018, provisional application No. 62/722,637, (Continued)

(51) Int. Cl.
*G06F 40/35* (2020.01)
*G10L 15/26* (2006.01)
(Continued)

(52) U.S. Cl.
CPC ............ *G10L 15/26* (2013.01); *G06F 40/205* (2020.01); *G06F 40/30* (2020.01); *G06Q 10/103* (2013.01); *G10L 15/183* (2013.01)

(58) Field of Classification Search
CPC ........ G06F 40/35; G06F 16/33; G06F 16/903; G06Q 10/101
See application file for complete search history.

(56) References Cited

U.S. PATENT DOCUMENTS

| 5,059,528 A | 10/1991 | Bollen et al. |
| 5,814,467 A | 9/1998 | Curtiss et al. |

(Continued)

FOREIGN PATENT DOCUMENTS

KR    2018-0019869    2/2018

OTHER PUBLICATIONS

U.S. Appl. No. 16/550,992, John Cronin, Intelligence-Driven Virtual Assitant for Automated Idea Documention, filed Aug. 26, 2019.
(Continued)

*Primary Examiner* — Daniel Abebe
(74) *Attorney, Agent, or Firm* — Polsinelli LLP

(57) ABSTRACT

An intelligence-driven virtual assistant for automated documentation of new ideas is provided. During a brainstorming session, one or more user participants may discuss and identify one or more ideas. Such ideas may be tracked, catalogued, analyzed, developed, and further expanded upon through use of an intelligence-driven virtual assistant. Such virtual assistant may capture user input data embodying one or more new ideas and intelligently process the same in accordance with creativity tool workflows. Such workflows may further stimulate creativity for capturing ideas, while continuing to document, analyze, and identify further aspects to develop and expand.

20 Claims, 11 Drawing Sheets

Related U.S. Application Data filed on Aug. 24, 2018, provisional application No. 62/722,641, filed on Aug. 24, 2018, provisional application No. 62/724,380, filed on Aug. 29, 2018.

(51) Int. Cl.
*G10L 15/183* (2013.01)
*G06Q 10/10* (2012.01)
*G06F 40/30* (2020.01)
*G06F 40/205* (2020.01)

(56) References Cited

U.S. PATENT DOCUMENTS

| | | |
|---|---|---|
| 6,266,635 B1 | 7/2001 | Sneh |
| 6,934,905 B1 | 8/2005 | Tighe |
| 7,493,253 B1 | 2/2009 | Ceusters et al. |
| 7,711,547 B2 | 5/2010 | Abir |
| 7,996,440 B2 | 8/2011 | Probst et al. |
| 8,131,557 B2 | 3/2012 | Davis et al. |
| 9,047,857 B1 | 6/2015 | Barton |
| 9,111,214 B1 | 8/2015 | Sharma et al. |
| 9,904,675 B2 | 2/2018 | Kantor et al. |
| 9,912,769 B2 | 3/2018 | Gong et al. |
| 10,013,980 B2 | 7/2018 | Borsutsky et al. |
| 10,834,145 B2 | 11/2020 | Buddenbaum et al. |
| 2001/0034629 A1* | 10/2001 | Cronin ............ G06Q 10/06311 705/7.13 |
| 2004/0189702 A1 | 9/2004 | Hlavac et al. |
| 2005/0182773 A1 | 8/2005 | Feinsmith |
| 2006/0036452 A1 | 2/2006 | Williams |
| 2006/0036529 A1 | 2/2006 | Williams |
| 2006/0036632 A1 | 2/2006 | Williams |
| 2006/0036635 A1 | 2/2006 | Williams |
| 2008/0046394 A1 | 2/2008 | Zhou et al. |
| 2010/0174760 A1 | 7/2010 | Longobardi et al. |
| 2012/0166414 A1 | 6/2012 | Decker et al. |
| 2012/0233037 A1 | 9/2012 | Lamoureux et al. |
| 2013/0117018 A1 | 5/2013 | O'Sullivan et al. |
| 2014/0122056 A1 | 5/2014 | Duan |
| 2014/0122083 A1 | 5/2014 | Xiaojiang |
| 2015/0007055 A1 | 1/2015 | Lemus et al. |
| 2015/0020002 A1* | 1/2015 | McKenzie ............ G06F 3/0482 715/753 |
| 2015/0271218 A1 | 9/2015 | Steingrimsson |
| 2016/0021557 A1 | 1/2016 | Tabet et al. |
| 2016/0044073 A1* | 2/2016 | Rosenberg .......... G06F 16/3329 715/753 |
| 2017/0235848 A1* | 8/2017 | Van Dusen ........... G06F 16/904 705/12 |
| 2017/0310613 A1 | 10/2017 | Lalji et al. |
| 2018/0018564 A1 | 1/2018 | Erenrich et al. |
| 2018/0032576 A1 | 2/2018 | Romero |
| 2018/0131645 A1 | 5/2018 | Magliozzi et al. |
| 2018/0174103 A1* | 6/2018 | Auger .................... G06Q 10/10 |
| 2018/0191596 A1 | 7/2018 | Bhaya et al. |
| 2018/0218285 A1 | 8/2018 | Oliner et al. |
| 2018/0357032 A1 | 12/2018 | Popovich et al. |
| 2019/0052701 A1 | 2/2019 | Rathod |
| 2019/0079996 A1 | 3/2019 | Mochel et al. |
| 2019/0279619 A1 | 9/2019 | Krasadakis |
| 2020/0065924 A1 | 2/2020 | Cronin |
| 2020/0066259 A1 | 2/2020 | Cronin |
| 2020/0167630 A1 | 5/2020 | Cronin |

OTHER PUBLICATIONS

PCT/US19/48115, Intelligence-Driven Virtual Assitant for Automated Idea Documentation, filed Aug. 26, 2019.
U.S. Appl. No. 16/551,365, John Cronin, Idea Assessment and Landscape Mapping, filed Aug. 26, 2019.
PCT/US19/48158, Idea Assessment and Landscape Mapping, filed Aug. 26, 2019.
U.S. Appl. No. 16/551,509, John Cronin, Ideation Virtual Assistant Tools, filed Aug. 26, 2019.
PCT/US19/48182, Ideation Virtual Assistant Tools, filed Aug. 26, 2019.
PCT/US19/48122, Idea Socring for Creativity Tool Selection, filed Aug. 26, 2019.
U.S. Appl. No. 16/551,509 Office Action dated Apr. 14, 2021.
U.S. Appl. No. 16/550,992 Office Action dated Jun. 2, 2021.

* cited by examiner

IDEA SCORING FOR CREATIVITY TOOL SELECTION

CROSS-REFERENCE TO RELATED APPLICATIONS

The present patent application claims the priority benefit of U.S. provisional patent application 62/722,421 filed Aug. 24, 2018, U.S. provisional patent application 62/722,637 filed Aug. 24, 2018, U.S. provisional patent application 62/722,641 filed Aug. 24, 2018, and U.S. provisional patent application 62/724,380 filed Aug. 29, 2018, disclosures of which are incorporated herein by references.

BACKGROUND OF THE INVENTION

1. Field of the Invention

The present disclosure is generally related to a virtual assistant, and more particularly related to intelligence-driven virtual assistant for automated documentation of new ideas.

2. Description of the Related Art

Creativity tools can help participants in a brainstorming session to optimize their innovation process. Innovative ideas in brainstorming sessions can be achieved via skilled facilitators reading a room and knowing the right implement to spark creativity in an individual or group. However, the lack of skilled facilitators creates a bottleneck effect in the field of innovation.

Thus, there exists a need for providing an interactive innovation tool to systematize documentation of creative thinking and innovation activities with highly engaging user experiences, and lifelike conversational interactions in real-time during an innovation or ideation session.

SUMMARY OF THE CLAIMED INVENTION

Embodiments of the present disclosure provide an intelligence-driven virtual assistant for automated documentation of new ideas. Such virtual assistant may capture user input data embodying one or more new ideas and intelligently process the same in accordance with creativity tool workflows. Such workflows may further guide development and expansion upon a given idea, while continuing to document, analyze, and identify further aspects to develop and expand.

Further embodiments may include systems for guiding conversational creation and innovation sessions. Such systems may include artificial intelligence (AI)-driven speech recognition, chatbots designed to stimulate conversations regarding ideas with one or more human users via auditory or textual prompts, semantic search and discovery into insights and relationships among ideas, technical databases, and scholarly literature, applying machine learning to identify creation patterns and to make decisions regarding promising ideas, knowledge management and discovery of relevant material from various online sources, automated production of an idea creation and development record, context-sensitive dashboard reports and analytics, and speech synthesis.

DETAILED DESCRIPTION

Embodiments of the present disclosure provide an intelligence-driven virtual assistant for automated documentation of new ideas. During a brainstorming (e.g., ideation, creation, creativity, innovation) session, one or more user participants may discuss and identify one or more ideas. Such ideas may be tracked, catalogued, analyzed, developed, and further expanded upon through use of an intelligence-driven virtual assistant. Such virtual assistant may capture user input data embodying one or more new ideas and intelligently process the same in accordance with creativity tool workflows. Such workflows may further guide development and stimulate creativity for capturing ideas, while continuing to document, analyze, and identify further aspects to develop and expand.

Further embodiments may include systems for guiding conversational creation and innovation sessions. Such systems may include artificial intelligence (AI)-driven speech recognition, chatbots designed to stimulate conversations regarding ideas with one or more human users via auditory or textual prompts, semantic search and discovery into insights and relationships among ideas, technical databases, and scholarly literature, applying machine learning to identify creation patterns and to make decisions regarding promising ideas, knowledge management and discovery of relevant material from various online sources, automated production of an idea creation and development record, context-sensitive dashboard reports and analytics, and speech synthesis.

Figure 1:
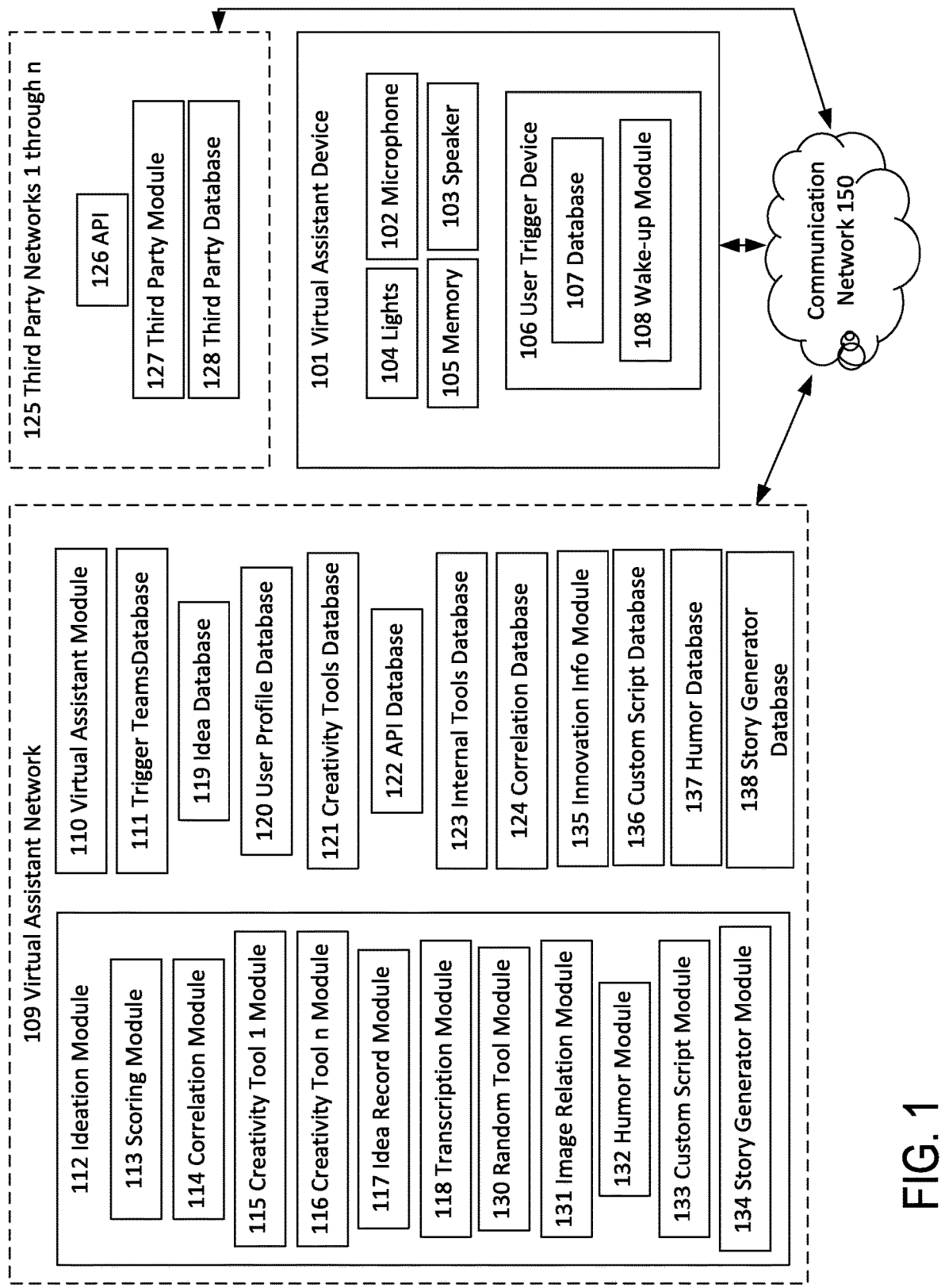
FIG. 1 illustrates an exemplary network environment in which an exemplary system for intelligence-driven virtual assistant for automated documentation may be implemented.

FIG. 1 illustrates an exemplary network environment in which an exemplary system for intelligence-driven virtual assistant for automated documentation may be implemented. The system can be a network having a virtual assistant network in communication with various other networks and devices in accordance with an embodiment. The network may comprise a virtual assistant device 101 for a user to interact with and may comprise a speaker 103, a microphone 102, lights 104, memory 105, and a user trigger device 106 having a database 107 and a wake-up module 108. The speaker 103 may be a smart speaker, a speaker of a computer, etc. The microphone 102 that may constantly capture audio data and store the audio data in the database 107 on the virtual assistant device 101. The lights 104 may illuminate, change colors and used to indicate different action, alerts, states of the virtual assistant device 101, and the type of light may include but not limited to light-emitting diodes (LED). The memory 105 may store information temporarily or permanently.

The user trigger device 106 may be any type of user interface that allows a user to trigger an action in the virtual assistant device 101 and a virtual assistant network 109, including but not limited to, a button (either wirelessly connected or directly connect to the virtual assistant device 101), a graphical button on a Graphical User Interface ("GUI"), etc. The database 107 may store temporarily or permanently speech and audio data captured by the microphone 102 on the virtual assistant device 101 as well as pre-programmed replies. The wake-up module 108 may continuously poll the audio data from the microphone 102 for a "wake-up term", phrase, keyword, or change in users' tone or volume, or other audio-based trigger.

The virtual assistant network 109 may be located on a remote server in communication with the virtual assistant device 101 via a communication network 150, or it may be integrated into virtual assistant device 101. The virtual assistant network 109 may comprise a virtual assistant module 110 that may be a virtual assistant such as, but not limited to, Amazon's Alexa, Google's Google Assistant, Apple's Siri, Microsoft's Cortana, etc., wherein certain words, phrases, invocations, or prompts may trigger other applications or modules or actions.

The communication network 150 may be inclusive of wired and wireless networks. The communication network 150 may be implemented, for example, using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques known in the art. The communication network 150 may allow ubiquitous access to shared pools of configurable system resources and higher-level services that may be rapidly provisioned with minimal management effort, often over the Internet and may rely on shared resources to achieve coherence and economies of scale, like a public utility, while third-party clouds enable organizations to focus on their core businesses instead of expending resources on computer infrastructure and maintenance.

The virtual assistant network 109 may comprise a trigger terms database 111 that may load and store words, phrases, terms, invocations, or prompts that are used to trigger certain actions or start applications. The virtual assistant network 109 may comprise an ideation module 112 that may be triggered when the virtual assistant module 110 recognizes a keyword, term or phrase to initiate the ideation module 112. The ideation module 112 may comprise a scoring module 113 that may quantify a score for ideas created and may weight scores based on how frequently a specific tool was used to create ideas. The ideation module 112 may comprise a correlation module 114 that may calculate a correlation between different user features (age, expertise, role in organization, etc.) and effective ideas produced by different creativity tool.

The ideation module 112 may comprise a random tool module 130 that can be any number of creativity tools that are randomly used to provide the user with random creativity data, for example, a user may want idea on "shovels" and the random tool module 130 may initially select one of many creativity tools such as word association, and the next time the random tool module 130 may provide the user with the definition rather than the word association.

The ideation module 112 may comprise an image relation module 131, a creativity tool the user could utilize that takes the keywords provided by the user(s), and may perform an image search for images related to that keyword(s), display a number of the images on a connected display, receive a user selection of one of those images, use object recognition or meta data tags to identify the object(s) in the image(s), which can be done as a form of word association, and the user can loop through the image relation module 131 as many times to obtain images farther away from the original keywords. The connected display(s) can be any number of the user interfaces that can receive a signal over a wireless network and display information provided by another computing device, such as a smart TV or laptop computer.

The ideation module 112 may comprise a humor module 132 that may continuously poll the ideation module 112 and the microphone 105 of the virtual assistant device 101 to determine when there is low activity. For example, if there have not been any new ideas during a predetermined timeframe during an ideation session or while the ideation module 112 is active, the humor module 132 may retrieve and output a random joke or humor from a humor database 137 with the intention of creating laughter. Furthermore, the humor module 132 may look at other variable, such as the novelty score of an idea, and if there are consecutive low novelty ideas recorded, the humor module 132 may output a random joke or humor.

The ideation module 112 may comprise a custom script module 133 that may continuously poll an output of the virtual assistant network 109, looking for known preprogrammed phrases, comparing the preprogrammed phrases to a custom script database 136, and substituting scripts from the custom script database 136 that is associated with the preprogrammed phrases. Furthermore, custom scripts can be randomly selected script or selected from a specific group of scripts related to a personality. For example, a user maybe get tired of hearing the repetitive preprogrammed responses that are the default output for the different modules on the virtual assistant device 101. Instead, the user may want to hear variations on the default responses in which the module will provide different scripted responses. For example, a default response such as "Do you want to hear more?" could be replaced with any number of scripted phrases like "Um . . . are you still thinking or could I provide you with a few more suggestions?"

The ideation module 112 may comprise a story generator module 134 that is another darker humor module, similar to a MadLib, which prompt users for different terms or phrases that are then added to a preprogrammed story from a story generator database 138. For example, the story generator module 134 may ask the user for words and phrases to fill in a story such as the name of a co-worker, a location, verbs, nouns, colors, animals, etc., until the user had filled in all of the blanks similar to a Mad Lib, at which point the module reads back the story to the user filling the blanks with the users responses.

The ideation module 112 may comprise a creativity tool 1 module 115 that may be any number of creativity tools. For example, the ideation module 112 may randomly select different types of creativity tools to use, such as (1) putting a verb randomly selected from a verb database in front of an initial term or (2) putting an associated word randomly selected from an associated database in front of the initial term, and allowing users to select specific creativity tools, etc.

The ideation module 112 may comprise a creativity tool n module 116, which may be any number of creativity tools.

For example, the creativity tool n module 116 may randomly select different types of creativity tools to use, allow users to select specific creativity tools, etc. The ideation module 112 may comprise an idea recording module 117 that may be triggered when a prompt comes from the virtual assistant module 110 and begins recording the user's idea, wherein the virtual assistant device 101 may store a recording in an idea database 119. A transcription module 118 may transcribe the recording, wherein a transcription of the recording may be stored in the idea database 119 and may be sent to a user terminal or via email or other electronic communication method. The idea database 119 may store the user's recordings as well as the respective transcriptions.

A user profile database 120 may store information about the user including but not limited to, email, position, usage data, idea generation, ideation training, etc. A creativity tool database 121 may store data for available creativity tools using APIs. An API database 122 may store all current APIs for the creativity tools. An internal tools database 123 may store data for custom creativity tools not available through an API. For example, the internal tools database 123 may store previous ideas, products, or services that can be improved on or direct a creativity or ideation session. A correlation database 124 may store correlations between user features and effective inventions coming from a given creativity tool.

The custom script database 136 may stores different custom scripts that can be preprogrammed by the user, wherein the custom scripts may be used to provide a more natural flow of language rather than just a few repetitive preprogrammed responses. Furthermore, the preprogrammed scripts could represent different personalities or humor. The humor database 137 may store a list of jokes, wherein the jokes can be preprogrammed, or the user can add them. The purpose of the humor database 137 may be to inject humor and laughter in to the innovation process as certain points of time since laughter can help stimulate creativity. The story generator database 138 can store MadLib-like stories that have users filling keywords, or phrases to complete the story resulting in the fictional death of a co-worker through dark humor.

A third-party network 125 may be one or more networks on the Internet, cloud, or network that stores module(s) and data for different creativity tools. For example, a third party network 125 may host a word association tool that could be accessed through an API. The word association tool may use a cross-idea association database and may associate words and word strings in a language by analyzing word formations around a word or word string to identify other words or word strings that are equivalents or near equivalents semantically. One method for associating words and word strings may include querying a collection of documents with a user-supplied word or word string, determining a user-defined amount of words or word strings to the left and right of the query string, determining the frequency of occurrence of words or word strings located on the left and right of the query string, and ranking the located words. An application programming interface ("API") 126 of the third party network 125 can be a set of subroutine definitions, communication protocols, and tools for building software, and particularly providing communication protocols to a variety creativity tools and databases on the Internet, cloud or remote servers. A third-party module 127 may input data such as a keyword or phrase to initiate a creativity tool on the third party network 125 and then may output results back to the ideation module 112. A third-party database 128 may store data associated with a creativity tool. For example, for word associated creativity tools, the -party database 128 may store synonyms. A cloud 140 or Internet connected to the communication network 150 may allow for ubiquitous access to shared pools of configurable system resources and higher-level services that can be rapidly provisioned with minimal management effort and the sharing of resources to achieve coherence and economies of scale.

Figure 2:
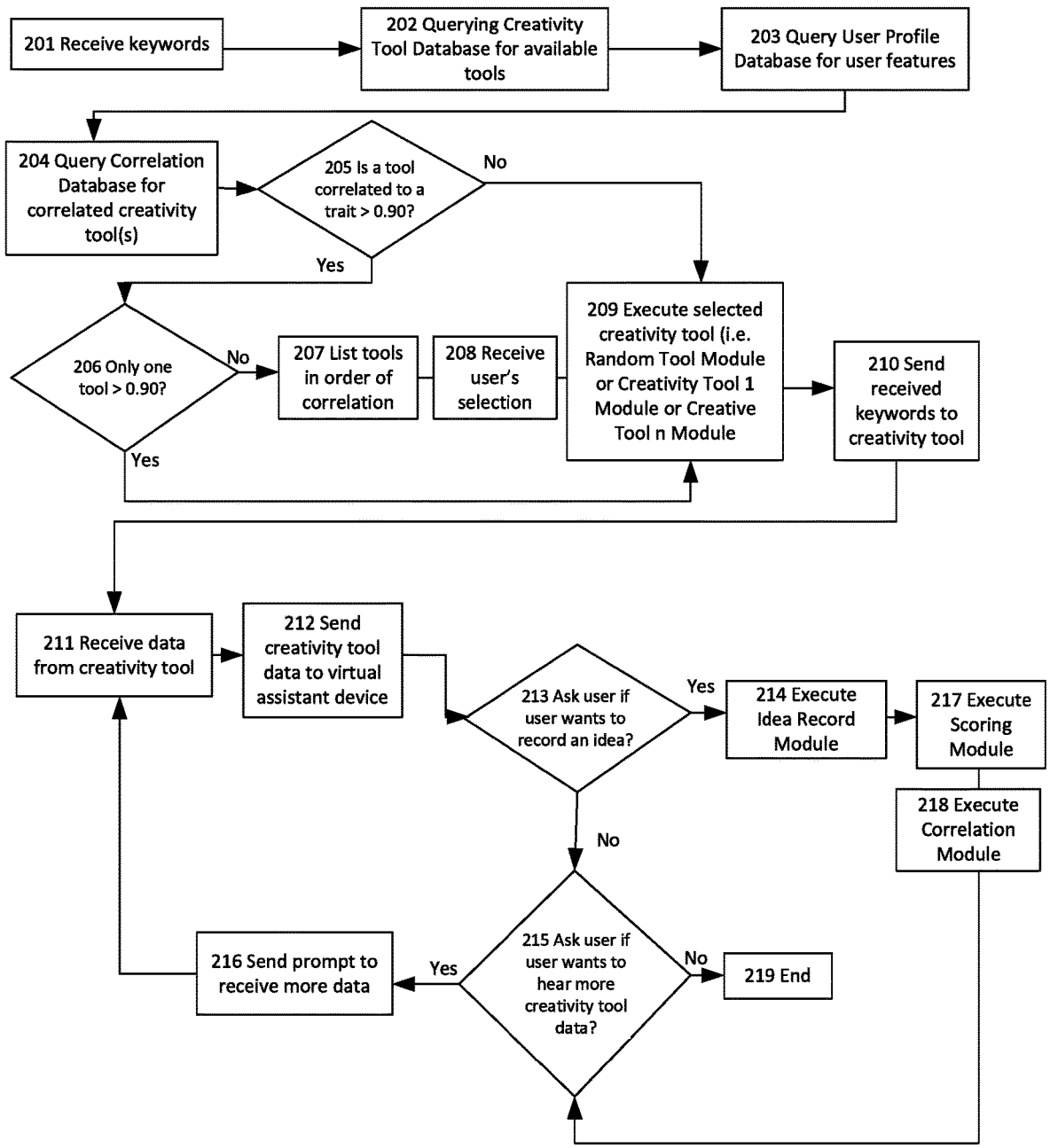
FIG. 2 is a flowchart illustrating an exemplary method of implementing an ideation module.

FIG. 2 is a flowchart illustrating an exemplary method of implementing an ideation module. In step 201, keywords may be received from the virtual assistant module 110. In step 202, the creativity tool database 121 may be queried for available creativity tools or methods, for example, random tool selection, or specific tools such as word association, word definition, AHA deck etc. In step 203, the user profile database 120 may be queried for user features, such as age, occupation, expertise, etc. In step 204, the correlation database 124 may be queried for creativity tools that correlate to user features present in the current group. In step 205, the correlation database 124 may be queried whether there a tool that is correlated to a present user trait with a correlation coefficient greater than 0.90. That number is chosen as an example in this embodiment and could be higher or lower in practice. If the number is greater, then in step 206, the correlation database 124 may be queried whether there only one tool that has a greater than 0.90 correlation coefficient. If there is only one, skip to step 209. If there is more than one, in step 207, correlated tools for the user are listed in order of most correlated to least and polled for the user selection. In step 208, the user's selected creativity tool may be received.

In step 209, the selected creativity tool may be executed, such as a random tool module, the creativity tool module 115, or the creative tool n module 116. In step 210, the keywords received from the virtual assistant module 110 may be sent to the selected creativity tool module. In step 211, data or keywords may be received from the creativity tool. In step 212, the creativity tool data may then be sent to the user via the virtual assistant device 101. In step 213, the user may be asked, using the virtual assistant device, if the user would like to record an idea. If the user does not want to record an idea, the user is asked if the user wants to hear more creativity tool data and, if the user wants to record an idea, in step 214, an idea record module 117 may be executed. Once the idea record module 117 has completed, the user may be asked if the user would like to record another idea. In step 215, the user may then be asked, using the virtual assistant device 101, if the user would like to hear more creativity tool data and, if the user does want to hear more creativity tool data, in step 216, the user may be prompt to be sent more data and go back to step 211 to receive more data from the creativity tool. In step 217, once the idea record module 117 has been executed, wherein the scoring module 133 may be executed and returns, to the ideation module 112, a numerical value score associated with the creative idea. In step 218, the correlation module 114 may be executed to compare the numerical value score of the created idea with user feature(s) and the creativity tool used. The ideation module 112 may continue to loop back to step 215 wherein the user may choose hear more creativity tool data or end the session.

Figure 3:
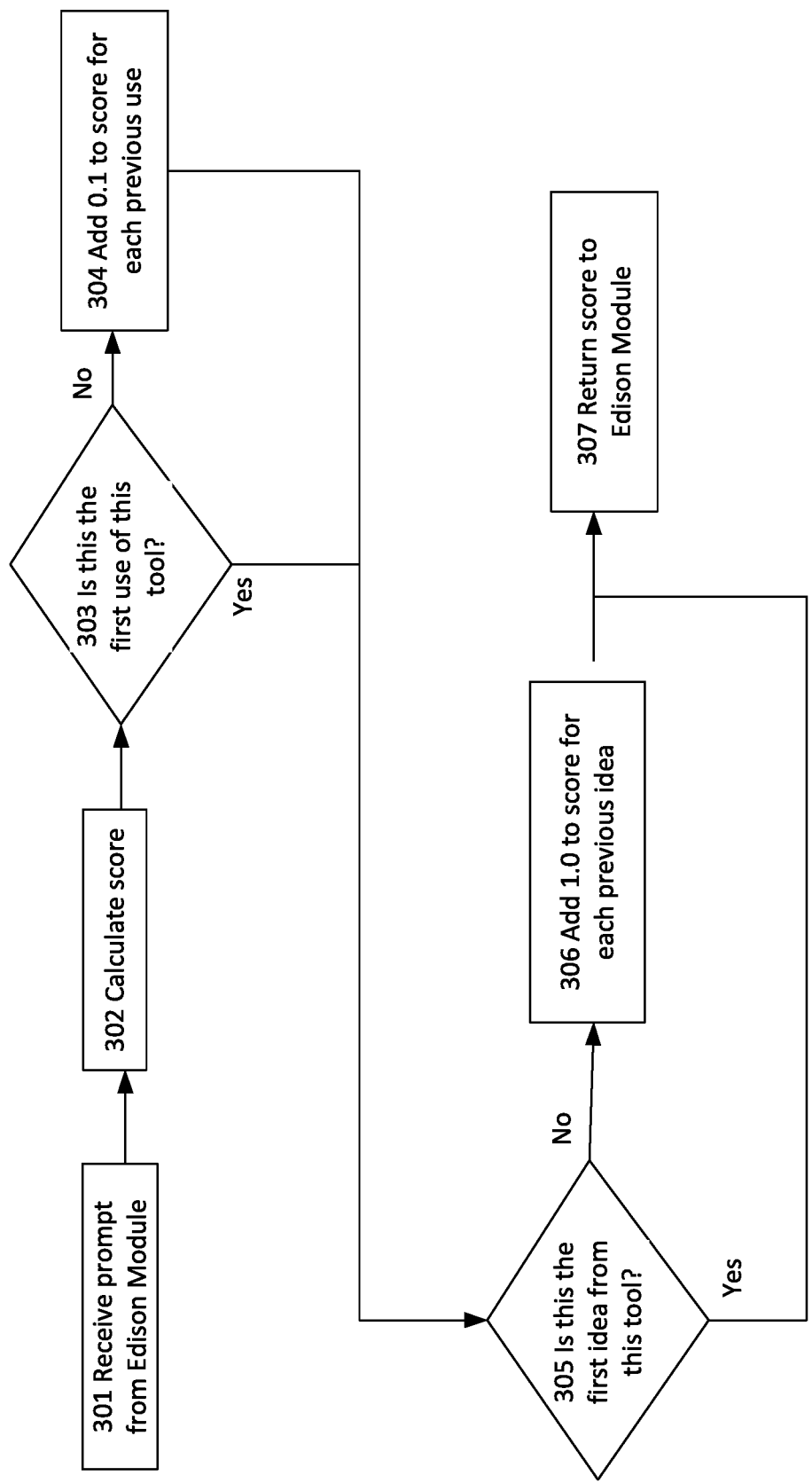
FIG. 3 is a flowchart illustrating an exemplary method of implementing the scoring module

FIG. 3 is a flowchart illustrating an exemplary method of implementing the scoring module. In step 301, a prompt may be received from the ideation module 112 that includes the created idea. In step 302, a score for the idea may be calculated. This is only one example of a method of calculating numerical scores to assess the value or novelty of an idea. In step 303, the user may be asked if the creativity tool is being used by this user or a group of users for the first time, and if not, in step 304, for each previous use of this tool, 0.1 may be added to the score of the idea. This is to weight the score in favor of creativity tools that the user(s) show a preference for by repeatedly utilizing it. In step 305, the user may be asked if this is the first idea from this tool, and if not, in step 306, for each previous idea 1.0 may be added to the calculated score of the idea. This is to weight the score in favor of tools that are prolific in generating ideas out of a user or group of users. In step 307, a weighted score is returned to the ideation module 112.

Figure 4:
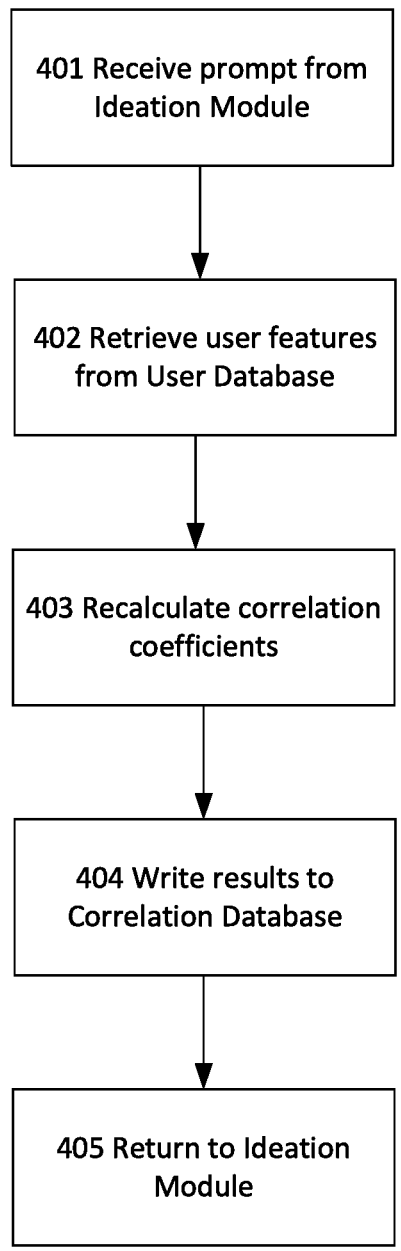
FIG. 4 is a flowchart illustrating an exemplary method of implementing the correlation module.

FIG. 4 is a flowchart illustrating an exemplary method of implementing the correlation module. In step 401, a prompt is received from the ideation module 112. In step 402, user features may be retrieved from the user database and in step 403, correlation coefficients between each user feature, such as age, may be recalculated with the weighted score of an idea being above a threshold set by the administrator as valuable. In step 404, updated correlation coefficients may be written in the correlation database 124. In step 405, the user may be returned to the ideation module.

Figure 5:
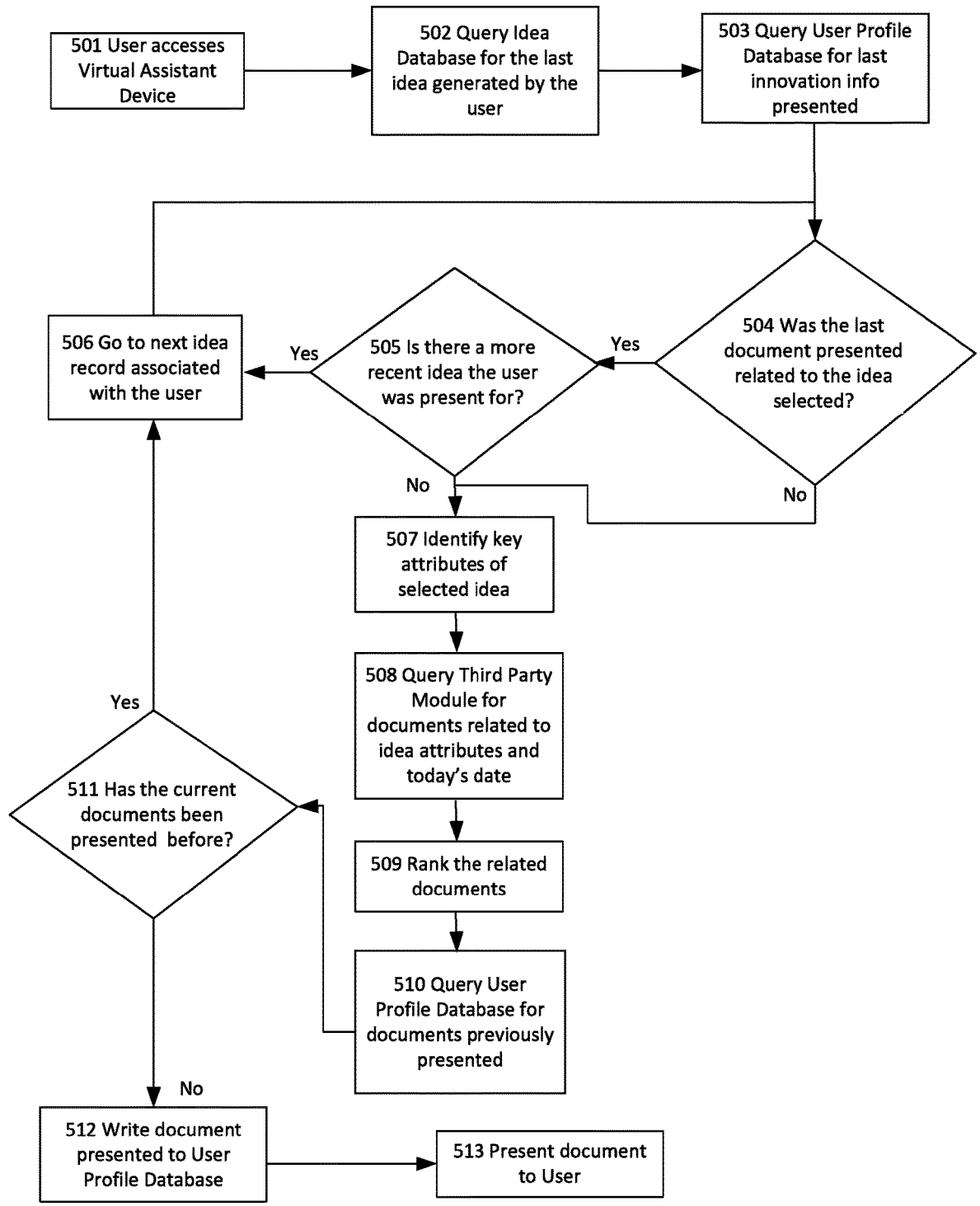
FIG. 5 is a flowchart illustrating an exemplary method of implementing an innovation info module.

FIG. 5 is a flowchart illustrating an exemplary method of implementing an innovation info module. In step 501, the virtual assistant device may be accessed. In step 502, the idea database 119 may be queried for the last idea generated by the present user. In step 503, the user profile database 120 may be queried for the last document presented to the present user. In step 504, if the last document presented was related to the idea selected, then in step 505, the idea database 119 may be queried for the last idea the user was present for the creation of. If the most recent idea records have been used for the present user, then in step 506, the user is presented with the next idea record associated with the present user and begins the filtering process again. If there isn't, in step 507, the attributes of the idea may be identified. For example, for an exemplary invention record "the present invention is an umbrella that is non-conductive to lessen the damage done in a lightning strike," the key terms identified would be "umbrella" and "lightning" and "conductive."

In step 508, the third party module 127 may be queried for documents related to some or all of the identified key terms along with current data, for example "August 8$^{th}$", and returning, for example, a document of U.S. Pat. No. 323,397 for the first umbrella stand was filed on that date in 1885. In step 509, the documents, or websites, retrieved may be ranked. In step 510, the user profile database 120 may be queried for documents previously presented to the current user. In step 511, it may be determined whether the present document has been presented to the user previously. If the user has not been previously presented with this document, in step 512, the document may be written to the user profile database 120 and in step 513, the data may be presented to the user. If the present document has been previously presented, the third party module 127 may retrieve a next highest ranked document in step 208. If the next highest ranked document has not been previously presented to the user and is above the predetermined threshold for relevance, the next highest ranked document may be written to the user profile database 120 and presented to the user. The threshold will be changed depending on the organization and how closely related to a given subject they feel information needs to be in order to inspire innovation in their workers. Some organizations will allow a very low threshold to encourage outside the box thinking, whereas others will require highly relevant information be presented to their users because they deal with very specific engineering issues.

Figure 6:
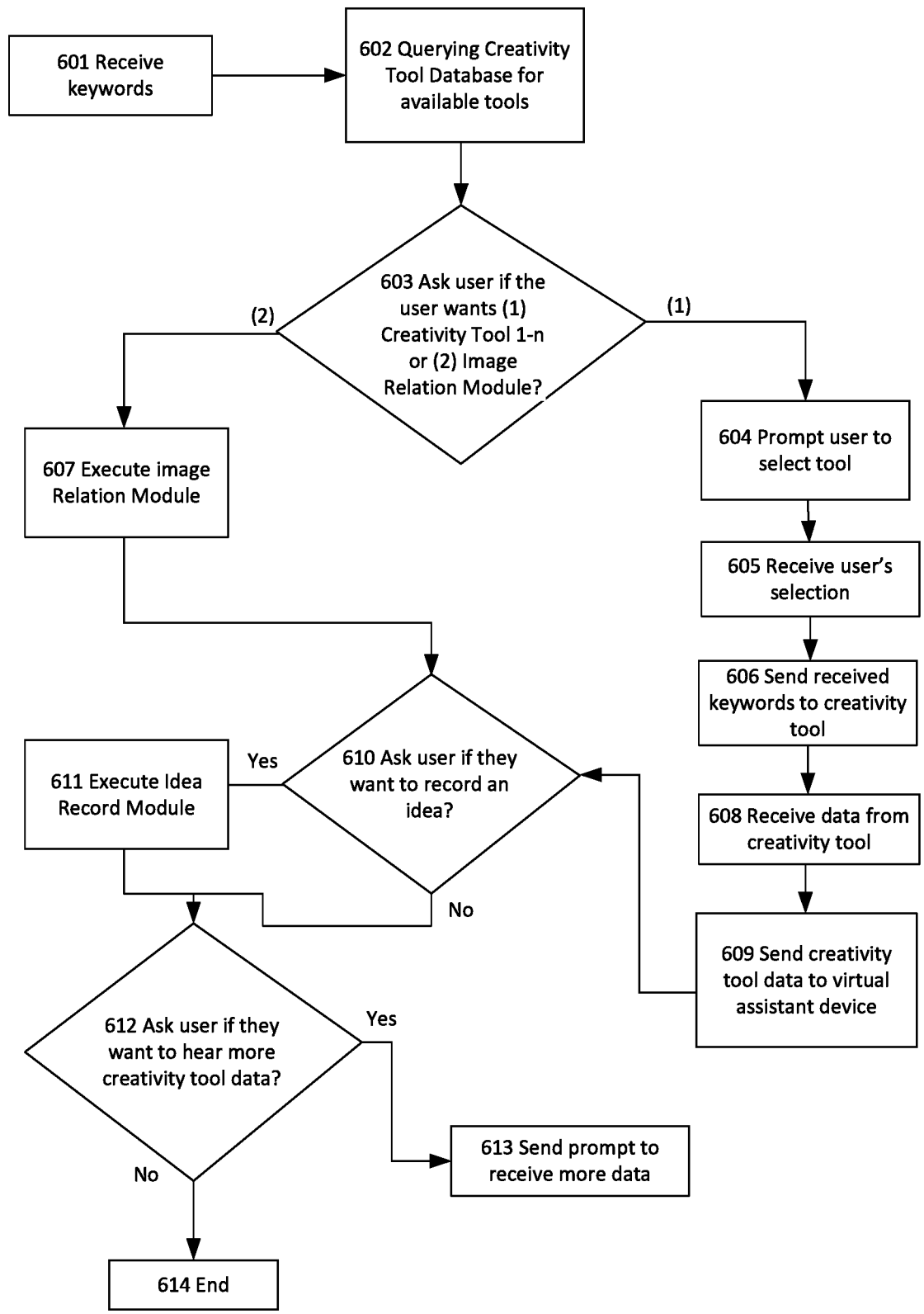
FIG. 6 is a flowchart illustrating an exemplary method of implementing the ideation module.

FIG. 6 is a flowchart illustrating an exemplary method of implementing the ideation module. In step 601, keywords may be received from the virtual assistant module 110. In step 602, the creativity tool database 121 may be queried for the available creativity tools or methods, for example, random tool selection, or specific tools such as word association, word definition, etc. In step 603, the user may be asked if the user wants to select a creativity tool from a list of available creativity tools, or use the image relation module 131. In step 604, the user may be prompted to select a tool if the user wants to select from the list of available creativity tools. In step 605, the ideation module 112 may receive the user's creativity tool selection via audio data from the virtual assistant device 101. In step 606, the keywords received from the virtual assistant module 110 may be sent to the creativity tool. In step 608, the ideation module 112 may receive data or keywords back from the creativity tool. In step 609 data from the creativity tool may then be sent to the user via the virtual assistant device 101.

If the user selected yes in step 603, in step 607, the image relation module 131 may be executed. In step 610, the user may be asked using the virtual assistant device 101 if the user would like to record an idea. If the user does not want to record an idea, the user may be asked if the user wants to hear more creativity tool data and if the user does want to record an idea, in step 611, the idea record module 117 may be executed. Once the idea record module 117 has completed, the user may be asked if the user would like to record another idea and in step 612, if the user wants to hear more creativity tool data. If the user does want to hear more creativity tool data, in step 613, a prompt may be sent to the creativity tool to see more data.

Figure 7:
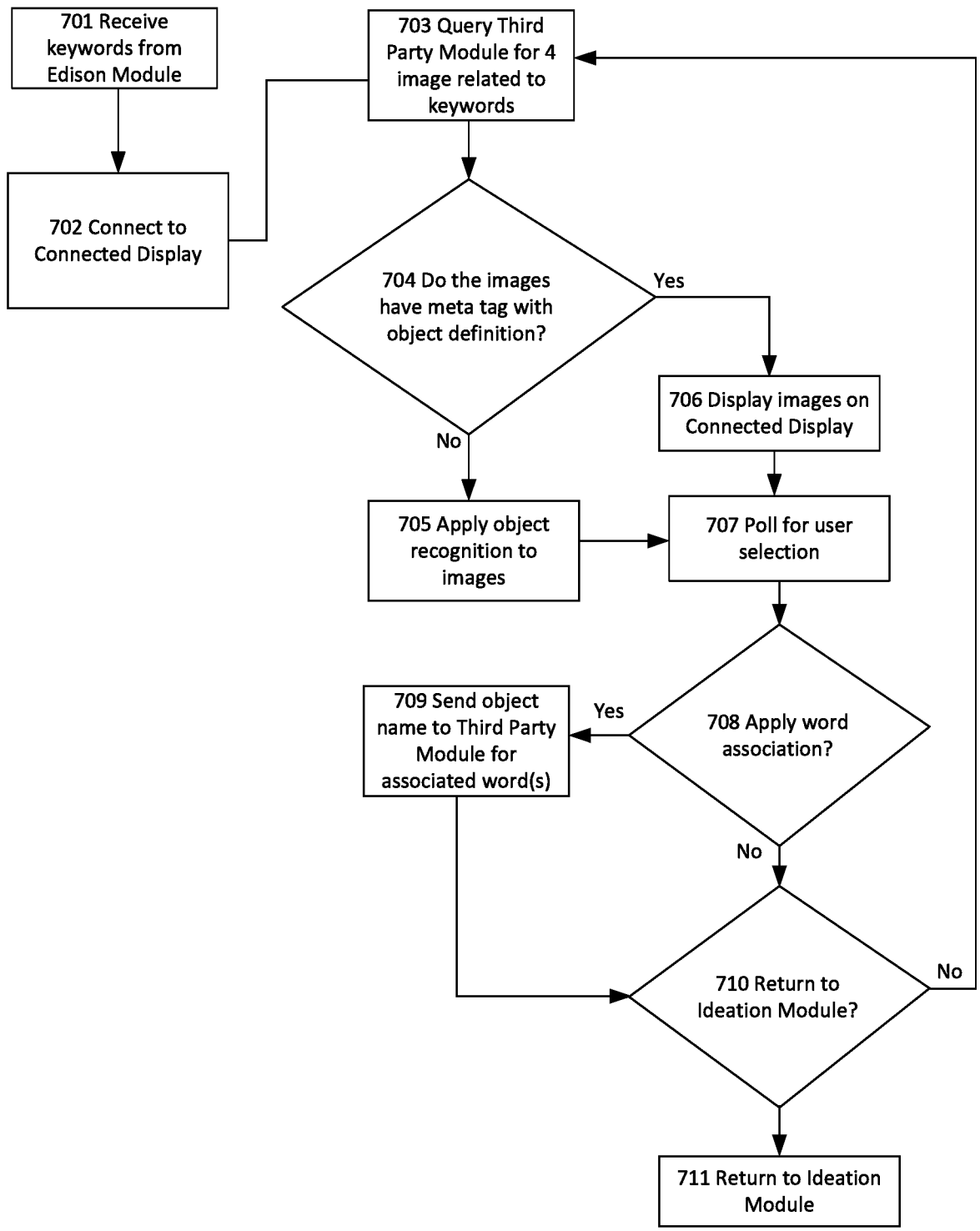
FIG. 7 is a flowchart illustrating an exemplary method of implementing the image relation module.

FIG. 7 is a flowchart illustrating an exemplary method of implementing the image relation module. In step 701, 301 receiving keywords from the ideation module 112. In step 702, a connected display or displays may be connected. In step 703, the third party module 127 may be queried for four images related to the keyword or keywords supplied by the user through the ideation module 112. In step 704, if the images retrieved are determined to have metadata tags that define the objects in the image, then in step 705, an object recognition system may be used to retrieve images that do not have meta data tags defining the objects in the. In step 706, the four retrieved images may be displayed along with the object definitions on the connected display(s). In step 707, the user may be polled to select one of the four images. In step 708, the user may be asked if the user would like to apply word association to the object definition from the selected image. In step 709, the object definition may be sent to another third party module 127 for word association wherein an associated word may be sent back to step 703. In step 710, the user may be asked if the user would like to return to the ideation module 112 if the user does not want to apply the associated word. If the user does not want to return to the ideation module 112, the original metadata or object recognition supplied object definition may be the word(s) sent to the third party module 127 in step 703 that retrieves related images. If the user chooses to return to the ideation module 112, then in step 711, the user returns to the ideation module 112.

Figure 8:
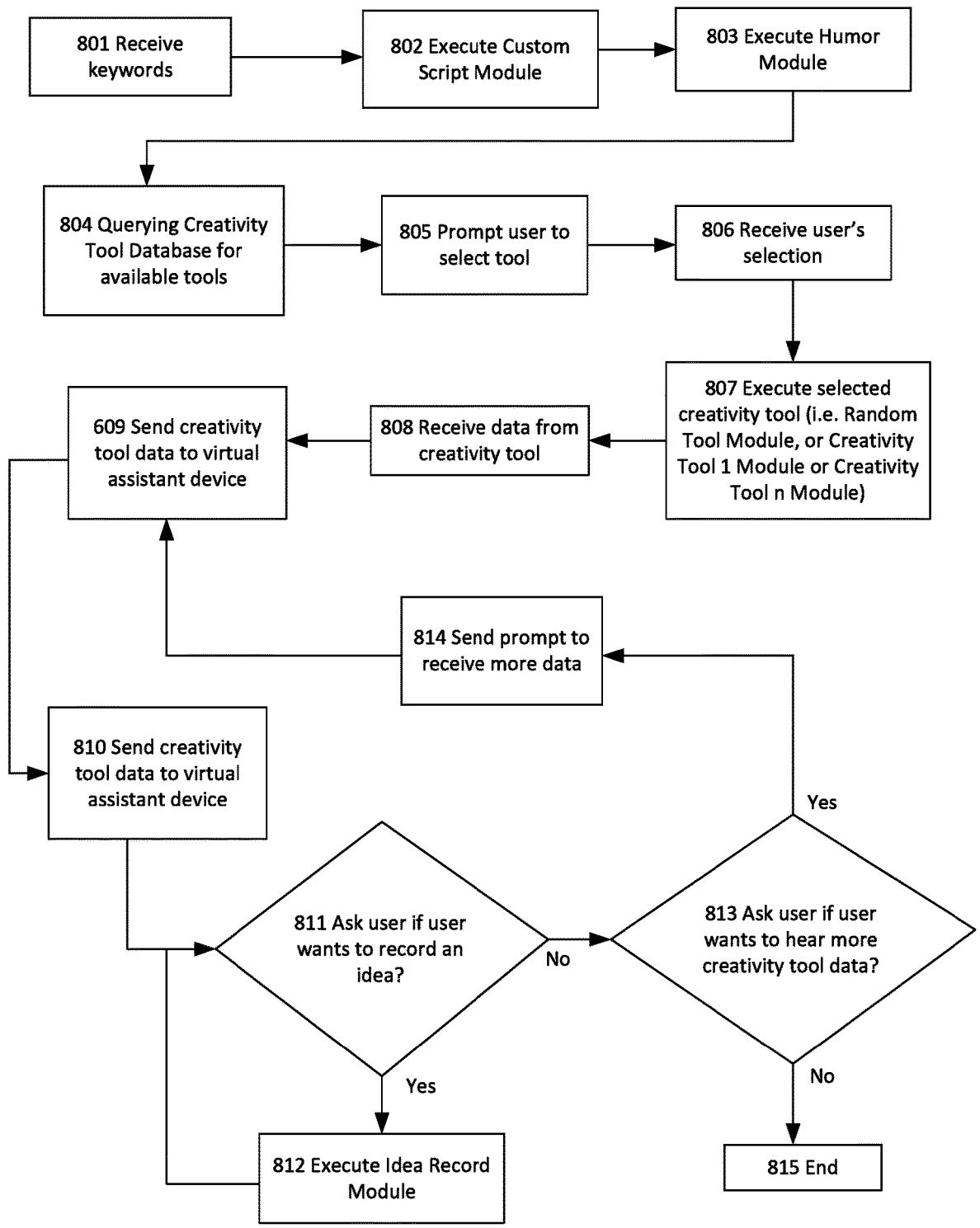
FIG. 8 is a flowchart illustrating an exemplary method of implementing the ideation module.

FIG. 8 is a flowchart illustrating an exemplary method of implementing the ideation module. In step 801, the keywords may be received from the virtual assistant module 110. In step 802, the custom script module 136 may be executed and after an initial prompt from the user continuously runs in the background. In step 803, the humor module 132 may be executed and run in the back ground while the ideation module 112 is running. In step 804, the creativity tools database 121 may be queried for the available creativity tools or methods, for example, random tool selection, or specific tools such as word association, word definition, etc. In step 805, the user may be prompted on the virtual assistant device 101 to select which tool or method the user would like to use. This feature could be pre-programmed so users don't get an option of which tool to use, and an administrator would have set up the user's options or preferences. In step 806, the ideation module 112 may receive the user's creativity tool selection via audio data from the virtual assistant device 101. In step 807, a selected creativity tool module is executed, for example if the user selects creativity tool 1, then the creativity tool 1 module 115 is executed. In step 808, the keywords received from the virtual assistant module 110 may be sent to the selected creativity tool module.

In step 809, the selected creativity tool module may receive data or keywords back from the creativity tool. In step 810, the creativity tool data may be then sent to the user via the virtual assistant device 101. In step 811, the user may then be asked using the virtual assistant device 101 if the user would like to record an idea. If the user does not want to record an idea, the user is asked if the user want to hear more creativity tool data. If the user wants to record an idea, then in step 812 the idea record module 117 may be executed. Once the idea record module 117 has completed, in step 813, the user is asked if the user would like to record another idea. If the user does not want to hear more creativity data the module ends in step 815. If the user does want to hear more creativity tool data, a prompt may be sent to the creativity tool to receive more data in step 814 wherein the selected creativity tool module receives the data at step 807.

Figure 9:
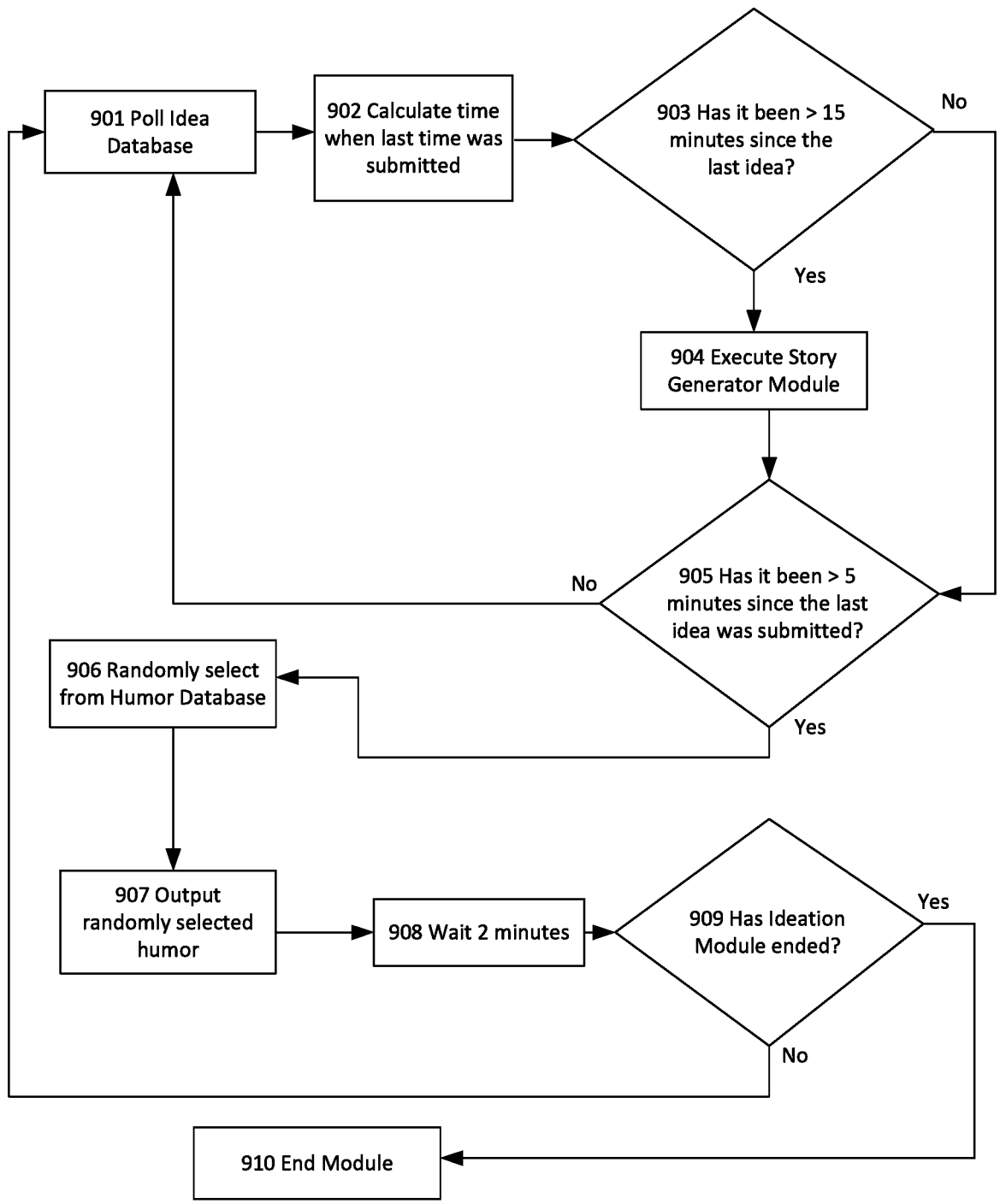
FIG. 9 is a flowchart illustrating an exemplary method of implementing the humor module.

FIG. 9 is a flowchart illustrating an exemplary method of implementing the humor module. In step 901, the humor module 132 may be executed at the beginning of the ideation module 112. In step 902, the idea database 119 may be polled for the when the last new idea was added to the idea database 119. In step 903, the time which the last idea was added to the idea database 119 is calculated using timestamp data in the idea database 119. For example, if the current time is 1:06 pm and the last idea was added to the database at 1:00 pm, the time since the last idea is 6 minutes. In step 903, if the calculated time since the last idea was submitted is more than 15 minutes, for example, then the story generator module 138 may be executed. If then, the calculated time since the last idea was submitted is less than five minutes, the polling may begin in step 903. The times in which the calculated time is compared can be preset by the user. If the calculated time is more than 5 minutes since the last idea was submitted, then in step 907, a random preprogrammed bit of humor may be selected from the humor database 137.

In step 908, the randomly selected humor (i.e. joke) may then output to the virtual assistant device 101. In step 909, the humor module 132 waits a certain time period, such as 2 minutes, until continuing. This may prevent the humor module 132 from outputting humor every few seconds and gives time to the users to develop and submit a new idea. In step 910, if the ideation module 112 had ended, it is assumed that the innovation or ideation session has concluded and the humor module 132 ends. If the ideation module 112 has not ended, the humor module 132 begins polling the idea database at Step 901. The module ends at step 911 when the ideation module 112 is no longer running.

Figure 10:
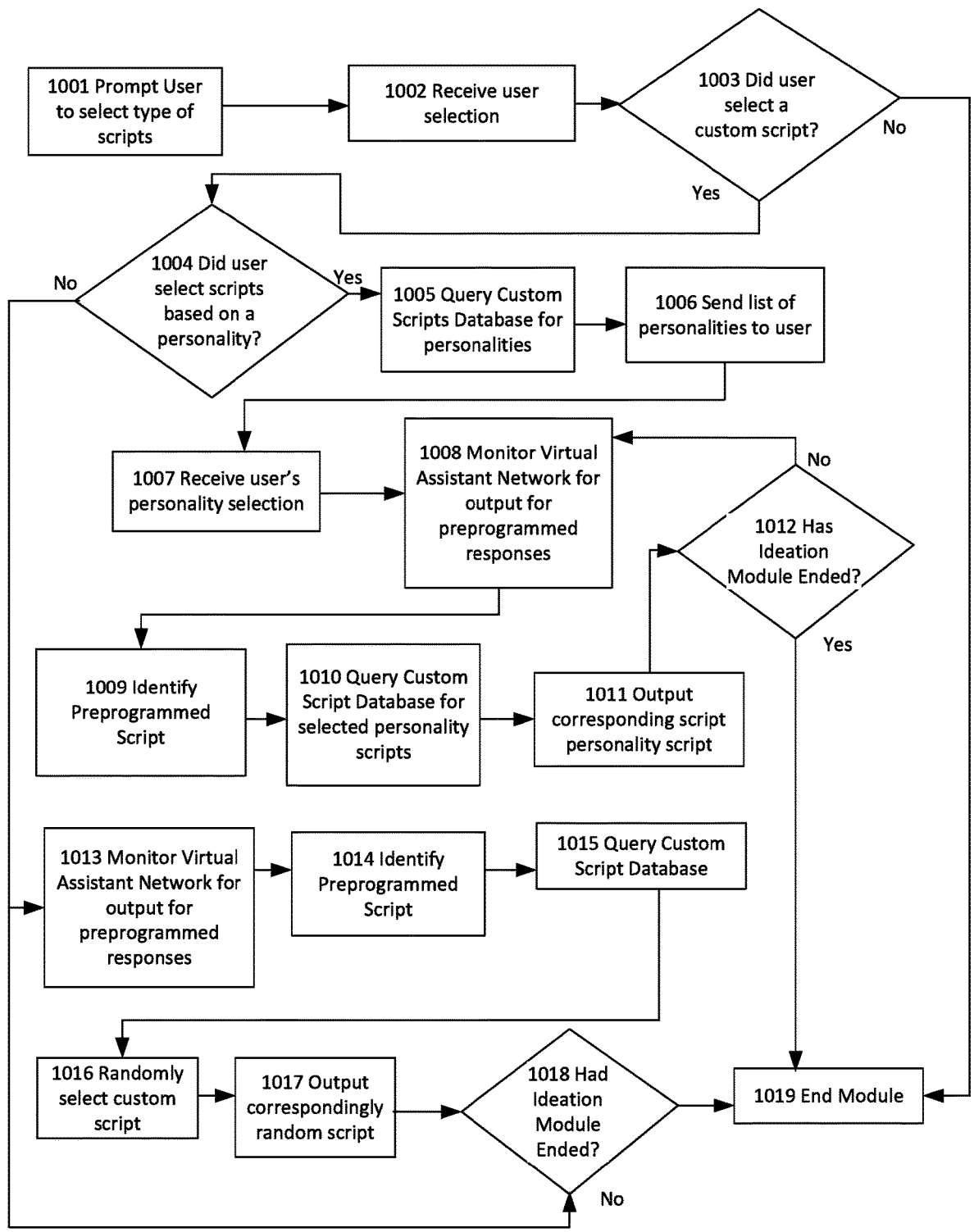
FIG. 10 is a flowchart illustrating an exemplary method of implementing the custom script module.

FIG. 10 is a flowchart illustrating an exemplary method of implementing the custom script module. In step 1001, the user may be prompted to select what custom scripts the user would like to use, such as random script, scripts based on a personality, or no custom scripts at all. In step 1002, the user's selection may be received. In step 1003, if the user did not select a custom script but instead selected no custom scripts, the module ends and preprogrammed scripts are used. If the user selects the custom scripts base on a personality, in step 1004, the module may query the custom script database 136 for a list of different personalities. If the user selects scripts based on personalities, in step 1005, the module then may query the customs script database 136 for the different personalities. In step 1006, a list of different personalities in the custom scripts database 136 may be sent to the user to select which personality the user would like. In step 1007, the user's selected personality may be received. In step 1008, the output, from the virtual assistant network 109, to the virtual assistant device 101 is continuously monitored by the custom scripts module 133 looking for preprogrammed phrases or responses that are outputted to the user through the virtual assistant device 101. In step 1009, the preprogrammed script that would normally be outputted to the virtual assistant device 101 may be identified. In step 1010, the custom script database 136 may be queried for a corresponding custom script to that matches the selected personality and the preprogrammed script.

In step 1011, the preprogrammed script may then be replaced with the corresponding personality script from the custom scripts database 136 and outputted to the virtual assistant device 101 instead of the preprogrammed phrase. In step 412, the custom script module 133 may check to see if the ideation module 112 has ended, wherein if the ideation module 112 has ended then the custom script module 133 may end. Otherwise, custom script module 133 returns to step 1008 and continues to monitor the virtual assistant network 109 for output. If the user does not select a custom script based on a personality in step 1004 it is assumed that the user selected random scripts and the output from the virtual assistant network 109 to the virtual assistant device 101 may be continuously monitored by the custom scripts module 136 looking for preprogrammed phrases or responses that are outputted to the user through the virtual assistant device 101.

In step 1014, the preprogrammed script that would normally be outputted may be identified. In step 1015, the custom script database 136 is queried to identify custom scripts that can be used in place of the preprogrammed scripts. In step 1016 the custom script module 133 may then randomly select a custom script that corresponds to the preprogrammed output. In step 417, the preprogrammed script may be replaced with the corresponding custom script that was randomly selected and may be outputted to the virtual assistant device 101 in place of the preprogrammed output. In step 418, the custom script module 133 may check to see if the ideation module 112 has ended. If the ideation module 112 has ended the custom scripts module 133 may end. Otherwise, the custom script module 133 may return to step 1013 and continue to monitor the virtual assistant network 109 for output, and in step 419 the custom script can end.

Figure 11:
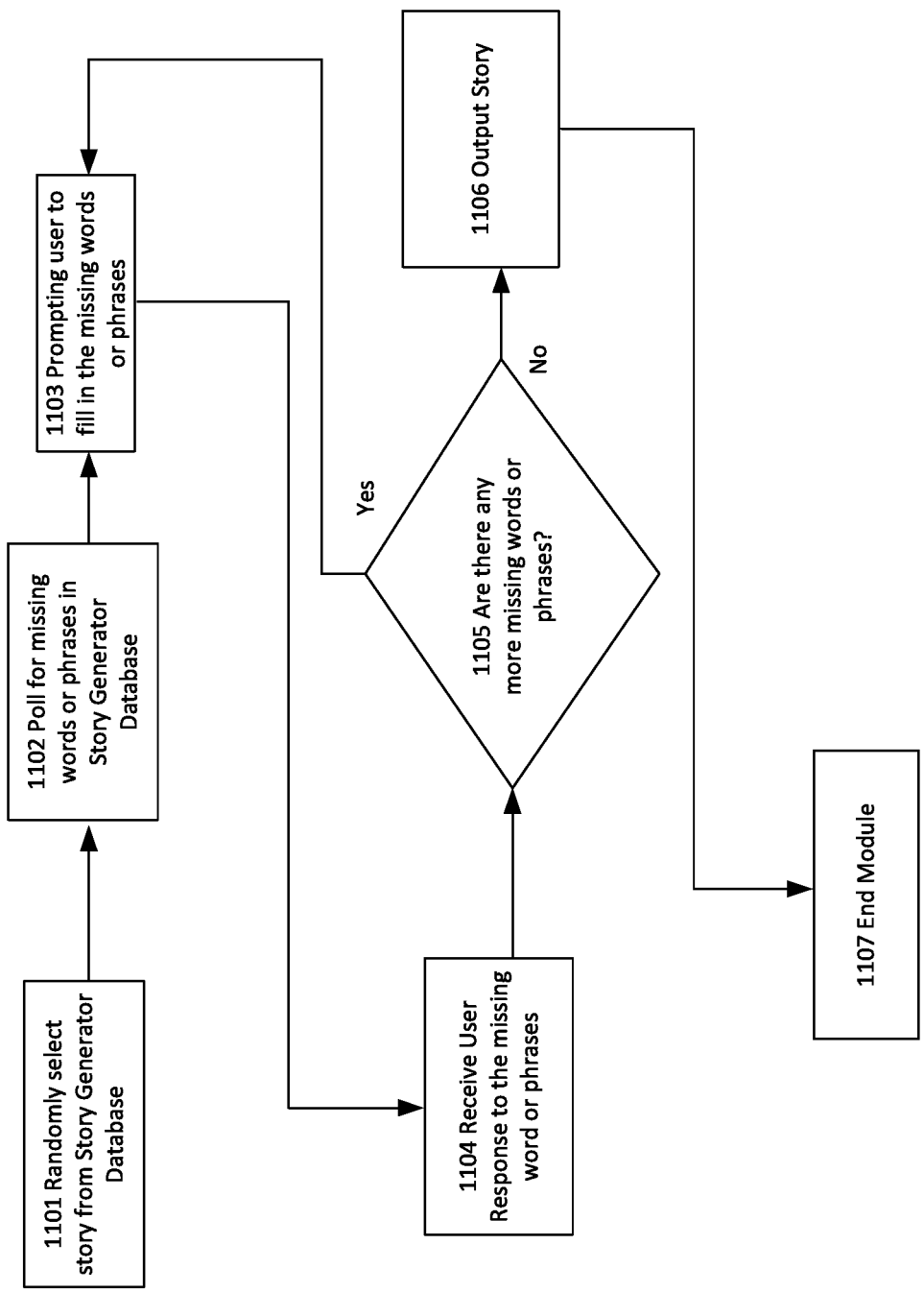
FIG. 11 is a flowchart illustrating an exemplary method of implementing the story generator module.

FIG. 11 is a flowchart illustrating an exemplary method of implementing the story generator module. In step 1101, the story generator module 138 may begin by randomly selecting one of the stored stories in the story generator database 138. The selection of a random line to use from the story generator database 138 can be achieved in a number of ways, such as using an algorithm that generates a random number and uses that random number as the line to the story generator database 138 to pull data from. Each story in the database can be incomplete stories that require a user to fill in certain variables similar to a "Mad Lib." In step 1102, the missing words or phrases corresponding to the randomly selected story can be retrieved from the story generator database 138, for example, similar to a Mad Lib, wherein the missing words or phrases would correspond to parts of a story, such as names, verbs nouns, adjective, locations, animals, etc. and are left blank for the user to fill in when prompted.

In step 1103, the missing words and variables missing from a story may be retrieved from the story generator database 138 and may be then sent to the user. There may be one or more missing words or phrases, and for stories with more than one missing word or phrase, the story generator module 138 may prompt the user for one response to a missing word or phrase at a time. In step 1104, the user's response to the missing word or phrase is temporarily stored either in the story generator module 138 or in any memory where it is retrieved in step 1106. In step 1105, if there are more missing words or phrases that require the user's response, the story generator module 138 returns to step 1103 and sends the next missing word or phrase to the user to fill in. In step 1106, if all missing words and phrases have been filled in, the story generator module 138 may then begin to output the story to the user through the virtual assistant device 101 and replacing the missing words and phrases with the users responses stored in step 1104. In step 1107, the story generator module 138 may end once the story has been completed.

Table 1 below illustrates an exemplary custom script database 136. The custom script database 136 may comprise a Script ID Number 1201, a unique identifier to identify the unique record in a database and a preprogrammed phrase 1202, a phrase that the custom script may replace. A personality 1203 of the script can categorize the script in to different types of personality base on how or what someone would say based on a personality. A custom script 1204 can be the script that will replace the corresponding preprogrammed phrase 1202 that is being outputted from the virtual assistant network 109 to the virtual assistant device 101.

TABLE 1

| 1201 Script ID Number | 1202 Preprogrammed Phase | 1203 Personality | 1204 Custom Script |
|---|---|---|---|
| 001 | "Would you like to hear more?" | Ditzy | "Um . . . like . . . would you like to hear more?" |
| 002 | "Would you like to hear more?" | Mean | "Bet you can't think of anything, so would you like to hear more, stupid?" |
| 003 | "Would you like to hear more?" | Geek | "Based on my calculation, the more suggestions I provide will result in a higher probability of coming up with new ideas, so would you like to hear some more suggestion?" |
| 004 | "OK, here are some more suggestions" | Ditzy | "Um . . . like . . . here to you go" |
| 005 | "OK, here are some more suggestions" | Mean | "Ha, I knew you couldn't think of anything. Here are some more suggestions!" |
| 006 | "OK, here are some more suggestions" | Geek | "I've run a complicated algorithm correlating the results and came back with the following suggestions" |
| 007 | "Do you want to record an idea?" | Ditzy | "Um . . . like . . . do you want to record something or what?" |
| 008 | "Do you want to record an idea?" | Mean | "Do you want to put your dumb idea on the record or what?" |
| 009 | "Do you want to record an idea?" | Geek | "Do you want to digitize your thoughts into a digital recording?" |

Table 2 below illustrates an exemplary humor database 132. The humor database 132 can comprises a humor ID 1301 that can be a unique identifier for each piece of humor stored in the humor database 132 and a humor or joke 1302 that can store the scripted of the joke or piece of humor that is to be output when the humor module 132 is executed.

TABLE 2

| 1301 Humor ID | 1302 Humor or Joke |
|---|---|
| 001 | My sister bet me a hundred dollars I couldn't build a car out of spaghetti . . . you should have seen the look on her face as I drove pasta! |
| 002 | How many South Americans does it take to change a lightbulb? A Brazillian. |
| 003 | What time does Sean Connery get to Wimbleton? Tennish |
| 004 | I went to the zoo the other day. It was empty except a single dog . . . it was a Shih Tzu |
| 005 | What kind of bagel can fly? A plain bagel |
| 006 | Where do animals go when their tails fall off? The retail store |
| 007 | Why can't you hear a pterodactyl going to the bathroom? Because the "P" is silent |
| 008 | How does a train eat? It goes chew chew. |
| 009 | Did you hear about the constipated mathematician? He worked his problems out with a No. 2 pencil |
| 010 | What's Forrest Gump's password? 1Forrest1 |

Table 3 below illustrates an exemplary story generator database 138. The story generator database 138 can comprise a story ID 1401 that can be a unique identifier that identifies each story in the story generator database 138 and a story 1402 that can store the different stories that can be used for dark humor. The stories 1402 can be preprogrammed or pulled from other sources and a miss words or phrases 1403 can store different missing words or phrases that are missing from the story which the user needs to fill in, wherein these missing words could be verbs, nouns, adjectives, names, location, or phrase that the user fills in to complete the story. The story generator database 138 can comprise user responses 1404 that can temporarily store the user's response 1404 to complete the story when it's time to output the completed story.

TABLE 3

| 1401 Story ID | 1402 Story | 1403 Missing Words or Variables | 1404 User Reply |
|---|---|---|---|
| 001 | [CO-WORKER NAME] was walking in [LOCATION] while [VICE] and smoking [PLANT] when a [ANIMAL] came out of nowhere and hit [CO-WORKER] causing a [INJURY]. While at the hospital the [DEVICE] complicated [CO-WORKER]'s [INJURY] killing [CO-WORKER]. | What is one of your co-worker's name? [CO-WORKER NAME] An animal? [ANIMAL] A minor injury you've had? [INJURY] A location? [LOCATION] A plant? [PLANT] A device that someone uses? [DEVICE] | [CO-WORKER NAME] [ANIMAL] [INJURY] [LOCATION] [PLANT] [DEVICE] |
| 002 | ... | ... | ... |
| 003 | ... | ... | ... |

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for ideation management, the method comprising
storing a creativity tools database in memory, the creativity tools database storing information regarding one or more available creativity tools;
receiving from a user via a virtual assistant module of a virtual assistant network, one or more keywords; and
executing instructions stored in memory, wherein execution of the instructions by a processor:
queries a correlation database for the available creativity tools that correlate to one or more features of the user, wherein each correlation is measured by a correlation coefficient,
selects a creativity tool from a list of creativity tools ordered by each respective correlation coefficient,
executes a creativity tool module associated with the selected creativity tool, wherein executing the creativity tool module includes inputting the keywords, and producing data based on the inputted keywords;
receiving one or more responses from the user, wherein the responses are identified by the user as an idea;
executes a scoring module to calculate a weighted numerical score for the identified idea, and
executes a correlation module to compare the weighted numerical score of the idea with the user features and the selected creativity tool used.

2. The method of claim 1, wherein the list includes creativity tools having a correlation coefficient that at least meets a predetermined threshold, and wherein selecting the creativity tool is based on a user selection from the list.

3. The method of claim 1, wherein the list includes only one creativity tool that has a correlation coefficient that at least meets a predetermined threshold, and wherein selecting the creativity tool includes automatically selecting the creativity tool that has the correlation coefficient that at least meets the predetermined threshold.

4. The method of claim 1, wherein the list includes no creativity tool that has a correlation incremental value for each previous use of the selected creativity tool and for each idea that was created by the selected creativity tool. coefficient that at least meets a predetermined condition, and wherein selecting the creativity tool includes selecting one of the creativity tools on the list at random.

5. The method of claim 1, wherein calculating the weighted numerical score includes adding an incremental value for each previous use of the selected creativity tool and for each idea that was created by the selected creativity tool.

6. The method of claim 5, wherein executing the correlation module further comprises:
retrieving the user features from a user profile database;
calculating correlation coefficients between each user feature with the weighted numerical score being above a threshold; and
updating the correlation coefficients in the correlation database.

7. The method of claim 1, further comprising:
querying an idea database for a last idea generated by the user;
querying a user profile database for a last set of innovation information presented to the user;
presenting a next idea record associated with the user when a last set of innovation information presented to the user is identified as being related to the idea and there is a more recent idea associated with the user; and identifying one or more attributes of the idea when a last innovation information presented to the user is not related to the idea or there is not a more recent idea associated with the user.

8. The method of claim 7, further comprising:
querying a third-party module for one or more sets of innovation information related to the identified attributes;
ranking the sets of innovation information based on respective relevance to the idea; and
storing at least one of the sets of innovation information to the user profile database if the at least one set of innovation information was not previously presented to the user.

9. The method of claim 1, further comprising executing an image relation module, wherein executing the image relation module comprises:
querying a third-party module for images related to the one or more keywords;
displaying a number of the images from the third-party module on a connected display;
receiving a user selection of one of the displayed images;
identifying one or more objects in the selected image using object recognition or metadata tags;
applying word associations received from the user; and
sending a selected object name to the third-party module.

10. The method of claim 1, further comprising executing a custom script module in response to a prompt from the user, wherein background execution of the custom script module continues during execution of a humor module.

11. The method of claim 10, wherein execution of the custom script further comprises:
receiving a user selection of a custom script;
monitoring the virtual assistant network for output with preprogrammed responses; and
replacing a corresponding custom script in place of a preprogrammed response.

12. The method of claim 11, wherein the user selection includes a selected personality, and further comprising selecting the custom script from a script database based on the selected personality.

13. The method of claim 12, wherein a plurality of scripts from the script database correspond to the selected personality, and wherein the user is presented with the plurality of scripts from the script database correspond to the selected personality.

14. The method of claim 11, wherein a plurality of scripts corresponds to the user selection, and further comprising selecting the custom script at random.

15. The method of claim 10, further comprising:
polling an idea database for a last new idea was added to the idea database;
identifying a time when the last new idea was added to the idea database based on a timestamp associated with the last new idea being added to the idea database;
executing a story generator module when the identified time meets a set threshold time, wherein executing the story generator module includes randomly selecting a story from a story generator database and polling the user via a virtual assistant device for one or more missing parts in the story until the story is complete; and
executing the humor module when the identified time is more than a second set threshold time, wherein executing the humor module includes selecting a preprogrammed bit of humor at random from a humor database and presenting the selected preprogrammed bit of humor to the user via the virtual assistant device.

16. A system for ideation management, the system comprising memory that stores a creativity tools database, the creativity tools database storing information regarding one or more available creativity tools;
a network interface that receives one or more keywords from a user via a virtual assistant module of a virtual assistant network; and
a processor that executes instructions stored in memory, wherein execution of the instructions by the processor:
queries a correlation database the available creativity tools that correlate to one or more features of the user, wherein each correlation is measured by a correlation coefficient,
selects a creativity tool from a list of creativity tools ordered by each respective correlation coefficient,
executes a creativity tool module associated with the selected creativity tool, wherein executing the creativity tool module includes inputting the keywords, and producing data based on the inputted keywords;
receiving one or more responses from the user, wherein the responses are identified by the user as an idea;
executes a scoring module to calculate a weighted numerical score for the identified idea, and
executes a correlation module to compare the weighted numerical score of the idea with the user features and the selected creativity tool used.

17. The system of claim 16, further comprising an idea database, wherein the processor further executes instructions to:
query the idea database for a last idea generated by the user;
query a user profile database for a last set of innovation information presented to the user;
present a next idea record associated with the user when the last set of innovation information presented to the user is identified as being related to the idea and there is a more recent idea associated with the user; and
identify one or more attributes of the idea when a last innovation information presented to the user is not related to the idea or there is not a more recent idea associated with the user.

18. The system of claim 16, further comprising an idea database, wherein the processor further executes instructions to:
poll the idea database for a last new idea was added to the idea database;
identify a time when the last new idea was added to the idea database based on a timestamp associated with the last new idea being added to the idea database
execute a story generator module when the identified time meets a set threshold time, wherein executing the story generator module includes randomly selecting a story from a story generator database and polling the user via a virtual assistant device for one or more missing parts in the story until the story is complete; and
execute the humor module when the identified time is more than a second set threshold time, wherein executing the humor module includes selecting a preprogrammed bit of humor at random from a humor database and presenting the selected preprogrammed bit of humor to the user via the virtual assistant device.

19. The system of claim 16, further comprising a custom script module executed by the processor in response to a prompt from the user, wherein background execution of the custom script module continues during execution of a humor module, and wherein a custom script is executed by the processor to:

receive a user selection of the custom script;

monitor the virtual assistant network for output with preprogrammed responses; and replace a corresponding custom script in place of the preprogrammed response.

20. A non-transitory, computer-readable storage medium, having embodied thereon a program executable by a processor to perform a method for ideation management, the method comprising:

storing a creativity tools database in memory, the creativity tools database storing information regarding one or more available creativity tools;

receiving from a user via a virtual assistant module of a virtual assistant network, one or more keywords;

querying a correlation database the available creativity tools that correlate to one or more features of the user, wherein each correlation is measured by a correlation coefficient;

selecting a creativity tool from a list of creativity tools ordered by each respective correlation coefficient;

executing a creativity tool module associated with the selected creativity tool, wherein executing the creativity tool module includes inputting the keywords, and producing data based on the inputted keywords;

receiving one or more responses from the user, wherein the responses are identified by the user as an idea;

executing a scoring module to calculate a weighted numerical score for the identified idea, and executing a correlation module to compare the weighted numerical score of the idea with the user features and the selected creativity tool used.

\* \* \* \* \*